United States Patent [19]

Braun

[11] 4,275,018
[45] Jun. 23, 1981

[54] GRID FOR CARRYING RANDOMLY DUMPED PACKING IN A MASS TRANSFER COLUMN

[75] Inventor: Roland Braun, Ludwigshafen am Rhein, Fed. Rep. of Germany

[73] Assignee: Raschig, G.m.b.H., Ludwigshafen, Fed. Rep. of Germany

[21] Appl. No.: 122,578

[22] Filed: Feb. 19, 1980

Related U.S. Application Data

[63] Continuation of Ser. No. 969,001, Dec. 13, 1978, abandoned, which is a continuation-in-part of Ser. No. 688,956, May 24, 1976, abandoned.

[30] Foreign Application Priority Data

Jun. 14, 1975 [DE] Fed. Rep. of Germany ....... 2526632

[51] Int. Cl.³ .............................................. B01D 3/32
[52] U.S. Cl. .................................................... 261/94
[58] Field of Search ..................................... 261/94–98, 261/DIG. 72; 52/665, 667, 668; 403/231, 346, 347; 55/223; 209/392, 393, 397–399

[56] References Cited

U.S. PATENT DOCUMENTS

| 756,861 | 4/1904 | Layton ................................... 52/665 |
| 1,113,678 | 10/1914 | Oechsle et al. ..................... 403/346 |
| 3,398,497 | 8/1968 | Hellmich et al. ...................... 52/665 |
| 4,065,220 | 12/1977 | Ruga ..................................... 52/665 |

FOREIGN PATENT DOCUMENTS 1026320 4/1966 United Kingdom ..................... 261/112

*Primary Examiner*—Frank W. Lutter
*Assistant Examiner*—Gregory N. Clements
*Attorney, Agent, or Firm*—Balogh, Osann, Kramer, Dvorak, Genova & Traub

[57] ABSTRACT

A grid-shaped grate for carrying randomly poured particles or filler bodies in mass transfer columns. Each grate comprises of a plurality of grid walls defining openings for receiving the particles or filler bodies, the openings being smaller in size than the particles or filler bodies. The grate is provided at each intersection of the grid walls with spacers which are equally spaced one from another at a distance which is approximately equal to the width of each grid opening. The height of each spacer is approximately equal in size to at least one half of a particle or filler body size, so as to prevent the particles or filler bodies from closing the grid openings.

4 Claims, 12 Drawing Figures

FIG. 7
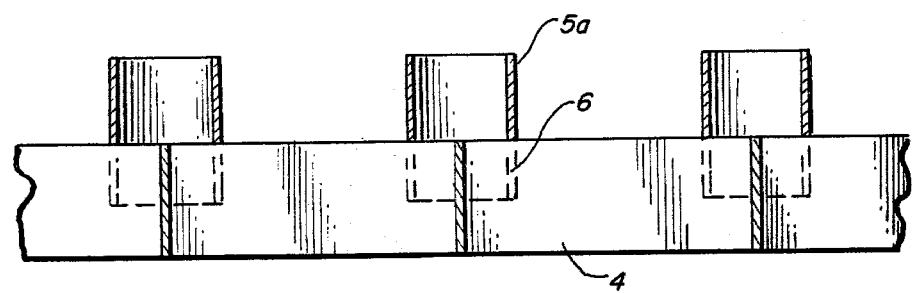
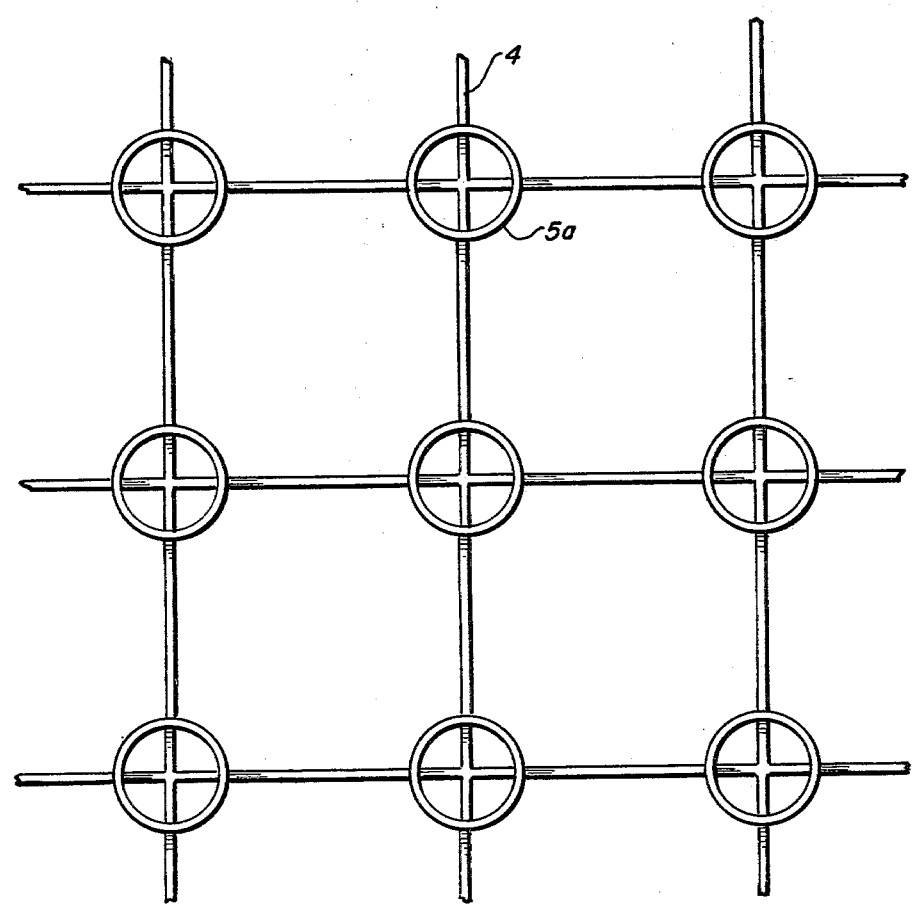
FIG. 8

GRID FOR CARRYING RANDOMLY DUMPED PACKING IN A MASS TRANSFER COLUMN

This is a continuation of application Ser. No. 969,001, filed Dec. 13, 1978, now abandoned, which is a continuation in part of Ser. No. 688,956 filed May 24, 1976, now abandoned.

This invention relates to a grid for carrying randomly dumped packing, e.g., in packed towers or in the form of packed beds, which grid has grid openings of any desired configuration, preferably square grid openings, and in which the thickness and height of the grid walls and the configuration of the grid openings are selected in dependence on the desired carrying capacity and permeability of the grid.

Packed towers are used for a mass transfer of liquid and gas between two oppositely flowing liquids differing in specific gravity. Packing is used also to carry a catalyst bed or, when provided with a coating, as a catalyst; in the latter case there is usually only one fluid (liquid or gas). Packing may be used not only for mass transfer or chemical reactions but also for heat exchange operations.

A grate for carrying such packings must meet various requirements. It must carry the weight of a packed bed as well as withstand any liquid head, and must be shaped so that the flow of the rising fluid, which consists in most cases of a gas and of the oppositely flowing liquid, are not blocked and are subjected only to a small pressure loss. If the total area of the grate openings is too small, liquid will be retained and in adverse cases the tower may be flooded.

Another requirement to be met by such grates resides in that the passages formed in the grate for the flow of the various fluids are distributed as uniformly as possible over the grid area so that the specified mass transfer rate ratio, which is important for the efficiency of the process, is maintained and is as uniform as possible throughout the grate area. Additional requirements are ease of installation and a most universal resistance to corrosion.

In ceramic grates known for the purpose described hereinbefore, short tubular members, which are of equal length and any desired cross-sectional shape and have vertically oriented axes, are arranged in a honeycomb array and each tubular member is firmly joined at one or more generatrices to one or more adjacent tubular members (German Pat. No. 741,221). Other known grates consist of flat bars arranged on edge and with clearances that are smaller in width than the particle size of the packings, and of grid-type grates. With the advent of modern packing having an increased permeability, new grate designs have been required because the area of the grate openings of the previously usual grates is restricted by the packing particles which lie directly on the grate so that there is a constriction at that point compared with the overlying packed bed.

It has been attempted to solve that problem by the provision of corrugated grates (see U.S. Pat. Nos. 3,064,954; 3,222,040; 3,222,041; and 3,419,253). Where these grates are used, the rising aqueous fluids enter the overlying packed bed through openings in the crests of the grate.

Liquid collects in the troughs between the crests and flows down through the openings in the troughs. Whereas grates of the kind are sufficiently permeable to gas and liquid because particularly the area of the gas passages has been greatly increased owing to the provision of the wave crests, these grates have other disadvantages because the division of the grate areas into zones for liquid flow and zones for gas flow requires a redistribution of the liquid when an additional packed bed is provided below the grate, as is mostly the case. This requirement is absent with other grates. Besides, the separation of phases has the result that the grate and the layer of packing immediately above the grate are ineffective to a high degree for a transfer of mass and heat. Besides, these grates are relatively complicated and for these reasons have not found general use.

The disadvantages described hereinbefore are eliminated in accordance with the invention by the provision of an improved grid-type grate for carrying randomly dumped packing or irregularly poured filler bodies in mass transfer or substance exchange columns, which grid has grid openings of any desired configuration, and particularly of square configuration, and in which grate the thickness and height of the walls or bars and the configuration of the grid openings are selected in view of the desired carrying capacity and the permeability of the grid. This grid according to the invention is characterized by the use of spacers for supporting the filler bodies which may be separate elements attached to the grid walls or spacing extensions or recesses in a height which is suitably approximately as large as one-half of the height or width dimensions (size), particle or filler body of the packing. The spacers or spacing means ensure that the packing does not lie on the grid openings and cannot close the same in part. When the height of the spacers is approximately one-half of the particle or filler body size of the packing, the packing or filler bodies which approximately lie directly on the grate will be arranged like the packing in the packed bed and will not form constrictions thereon. As a result, grids according to the invention have the same permeability as the packed bed even when the same lies directly on the grid.

Further, in accordance with the present invention, the openings formed in the grate for facilitating the mass flow through the particles of the packing or randomly poured filler bodies, are distributed as uniformly as possible over the grate area so that the specified mass transfer rate ratio, which is important, for the efficiency of the process, is maintained and is as uniform as possible throughout the grate area. This can be achieved only through the use of the spacers or spacing means that prevent the particles or filler bodies from covering or closing the openings in the grate.

The openings are usually equal in size and being smaller in size than the filler bodies received therein. The spacing members which are equally spaced one from another are placed at a distance from each other which is equal to the width of each opening.

However, it should be noted that in embodiments of the invention using material (e.g. ceramic material) which requires the grid walls to be thicker for added wall strength, the distance between individual spacers will not be equal to the width of the grid openings but to the sum total of the wall thickness plus the width of the grid opening.

The spacers or spacing extensions may be cruciform or cross-shaped and mounted directly on top of the crossings of the grid bars or intersections of the grid walls. This will result in a particularly high resistance to breaking. Spacers or spacing extensions of other cross-sectional shapes may also be used, particularly in grids having different grid opening configurations.

Further details of the grid according to the invention will be described hereinafter with reference to the drawings, in which:

FIG. 1 also shows a filler body lying on the grid to demonstrate the relationship in size between the spacers and filler bodies.

FIGS. 7 and 8 are side and plan views, respectively, of the grid-type grate provided with cylindrical sleeves 5a affixed to the grate at each intersection of the grid walls, as well as illustrating a filler body.

Figure 12:
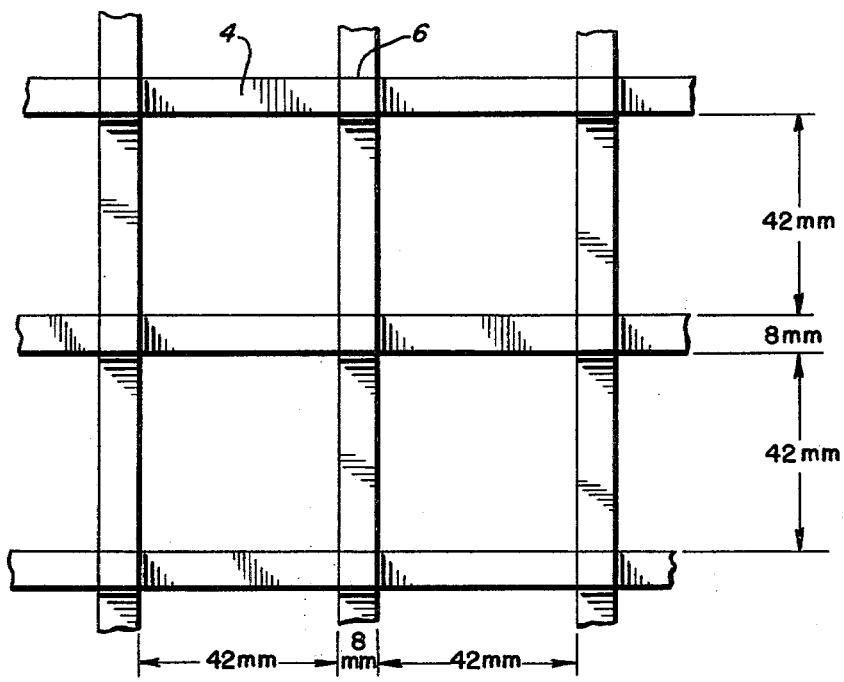
FIGS. 11 and 12 are fragmentary transverse sectional and top plan views showing the basic embodiment of the invention with spacers 6 and using also dimensions, e.g., for a 50 mm packing.
Figure 11:
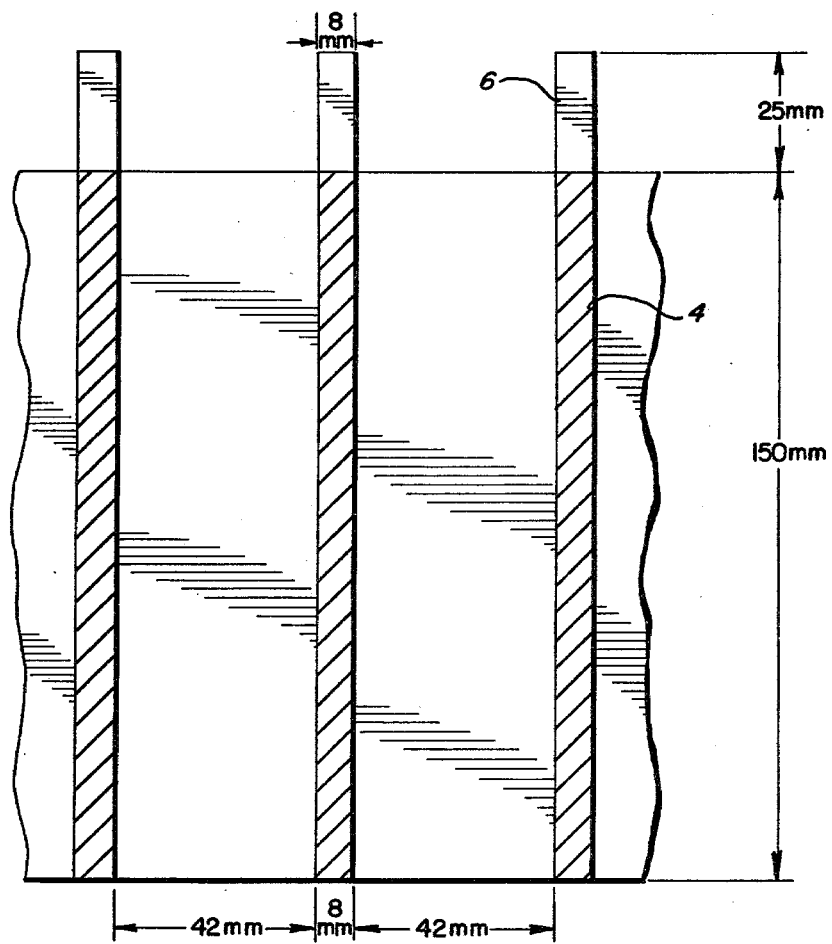
Figure 13:
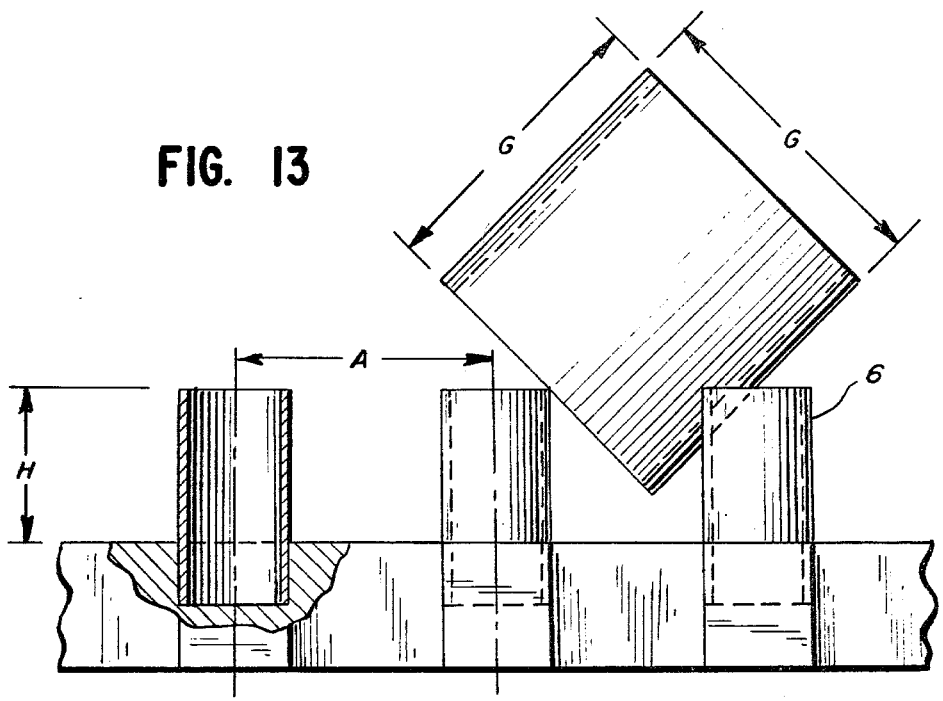
Figure 14:
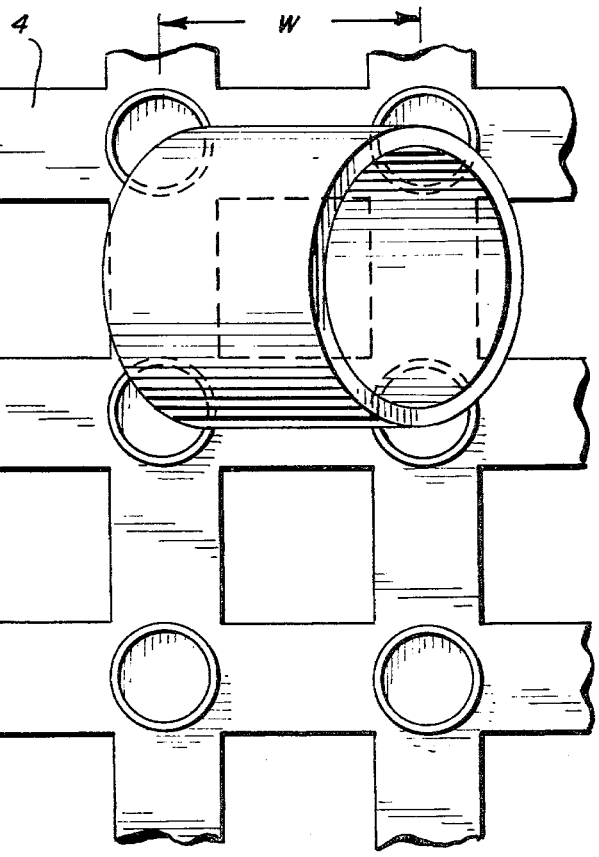

FIGS. 13 and 14 are side and top plan views, respectively, of the grid-type grate embodiment of FIGS. 11 and 12, illustrating the spacers 6 engaging a filler body.

Figure 1:
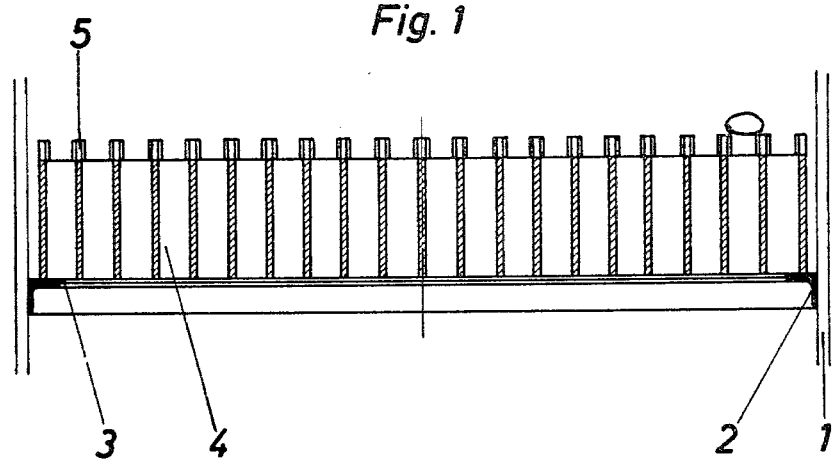
FIGS. 1 and 2 are a transverse sectional view and a top plan view showing a first embodiment of a packed tower having a grid-type grate for carrying randomly dumped packing.

As is apparent from FIG. 1 showing the first embodiment, an angle-section steel ring 2 is secured in a column 1, e.g, by welding, and is provided on top with an elastic washer 3, on which a grid 4 is placed, which is provided with spacers 5 according to the invention. In ceramic grids, these spacers are provided, e.g, on the crossings of the grid bars, or at the intersection of the grid walls. A ceramic grid may be manufactured, e.g., in that bars are extruded and joined in the desired arrangement. Those portions of these bars which are forced together are smaller in wall thickness so that the desired wall thickness is obtained at the crossings too. In metal grates, the spacers can simply be fitted from above at the crossings. In accordance with the invention, the spacers may consist of cylindrical sleeves having on one side thereof a closed end and the opposite side thereof, an open end. The open ends of each sleeve may be provided with elongated vertical slots (such as rectangular) for slipping the sleeves on the sections of the grid walls adjacent the intersections thereof. In a grid having square openings, cylindrical sleeves, which have four rectangular (or other suitable shape) slots, may be used. The cylindrical sleeves are suitably slipped on the grid walls at the crossings, by means of the rectangular (or other suitable shape) slots or slits provided therein so as to define cruciform or cross-shaped cut-out members at each intersection of the grid walls, the cut-out members covered by the sleeves. The spacers may be welded to the grid if a permanent joint is desired.

Figure 2:
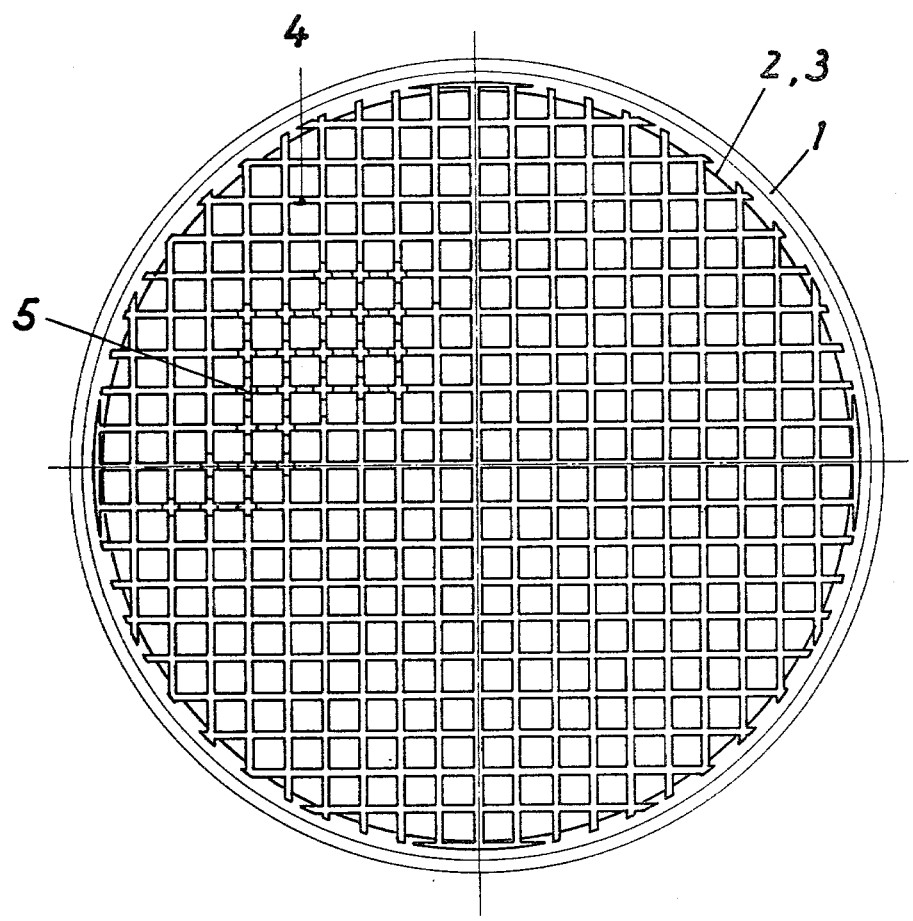
Figure 3:
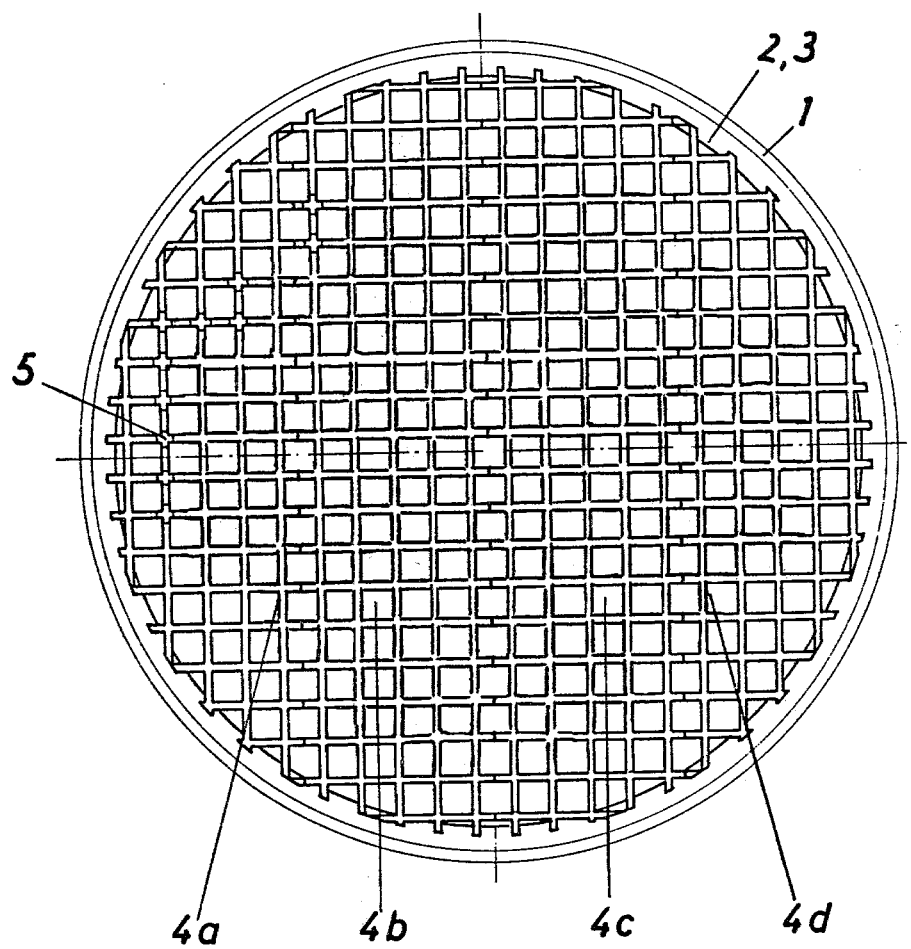
FIG. 3 is a top plan view showing a second embodiment of such grid.

FIG. 2 is a top plan view showing like FIG. 1 an integral grid 4. The grid shown in FIG. 3 consists of four self-supporting parts 4a to 4d, which rest on the ring 2. If grids are required to have a very high carrying capacity, they will have a small height. The grid may be supported by intermediate beams, which beams may also be used with ceramic grids, if they have a required carrying capacity only in a length which exceeds the largest length in which an integral grid can be manufactured.

Ceramic grids can be made without difficulty up to a certain span. Grids having larger spans for higher carrying capacities will be provided with supporting beams, as described hereinbefore.

All grid opening configurations which are conceivable and practical may be used. As regards particular configurations, not only the square configuration shown in the drawings, but also triangular grid openings, hexagonal grid openings, and the like, may be used, provided that the grid opening area is as large as compatible with the required carrying capacity of the grid. The grid openings should be only slightly smaller than the particle size of the packing.

Figure 4:
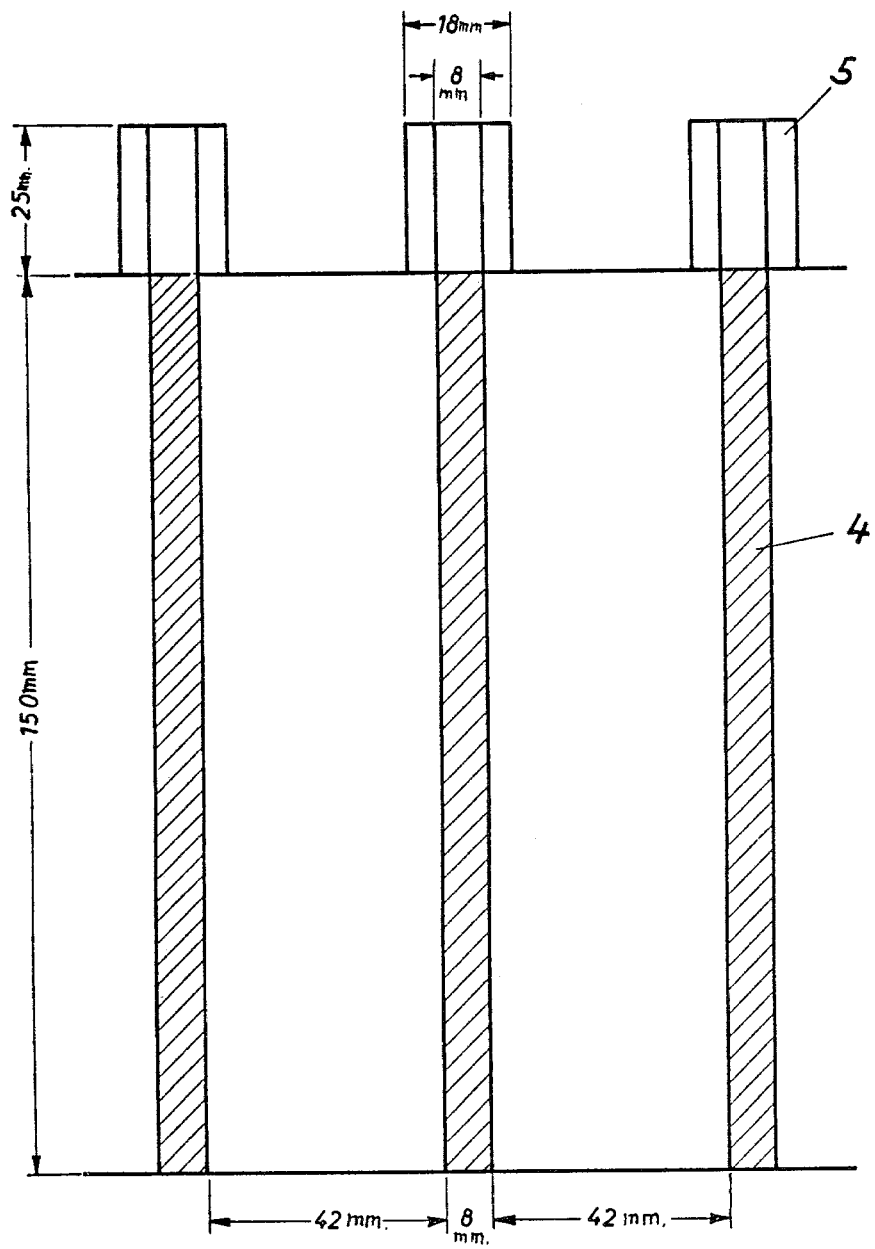
FIGS. 4 and 5 are fragmentary transverse sectional and top plan views showing a specific embodiment with dimensions used, e.g., for a 50-mm packing.
Figure 5:
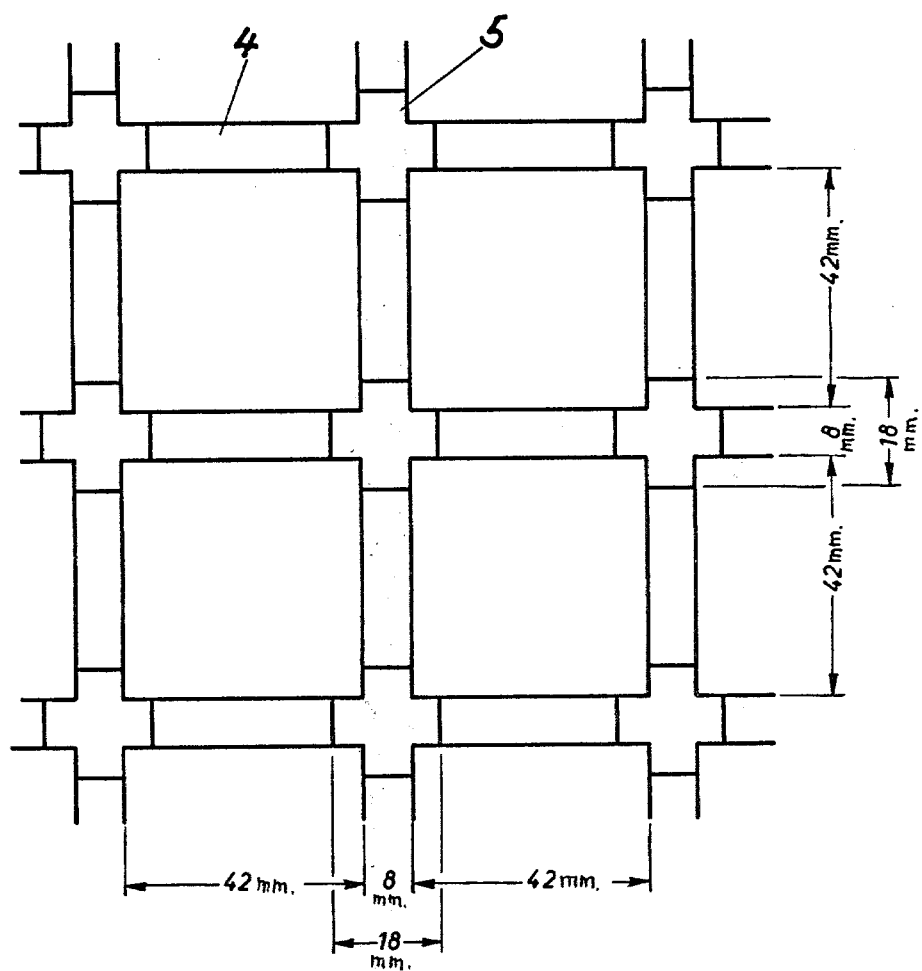

Owing to the provision of the spacers 5 in accordance with the invention, particularly at the crossings, the grid does not provide a plane surface for supporting the packing (not shown) so that the latter cannot partially close the grid openings. FIGS. 4 and 5 show another embodiment for a 50-mm packing, and are provided with dimensional information. In this case, the grid openings have a width of 42 millimeters, and the spacers have a height of 25 millimeters, which is more than one-half of the particle or filler body size of the packing. As a result, the packing particles or filler bodies which lie directly on the grid are arranged like those in the packed bed, as has been described hereinbefore.

The grids according to the invention can be made from ceramic material in a simple manner because extruded bars can be joined in a known manner in that the bars are roughened, provided with slip, forced together, dried and fired, so that integral and composite grid-type grates, as shown in FIGS. 1 to 4, can be obtained.

Grids according to the invention may also be manufactured in a simple manner from metallic materials. It is sufficient to provide a grid having suitable dimensions, such as are used in engineering for many purposes, and to add the spacers according to the invention, which may be fitted on or welded to the grid.

Figure 6:
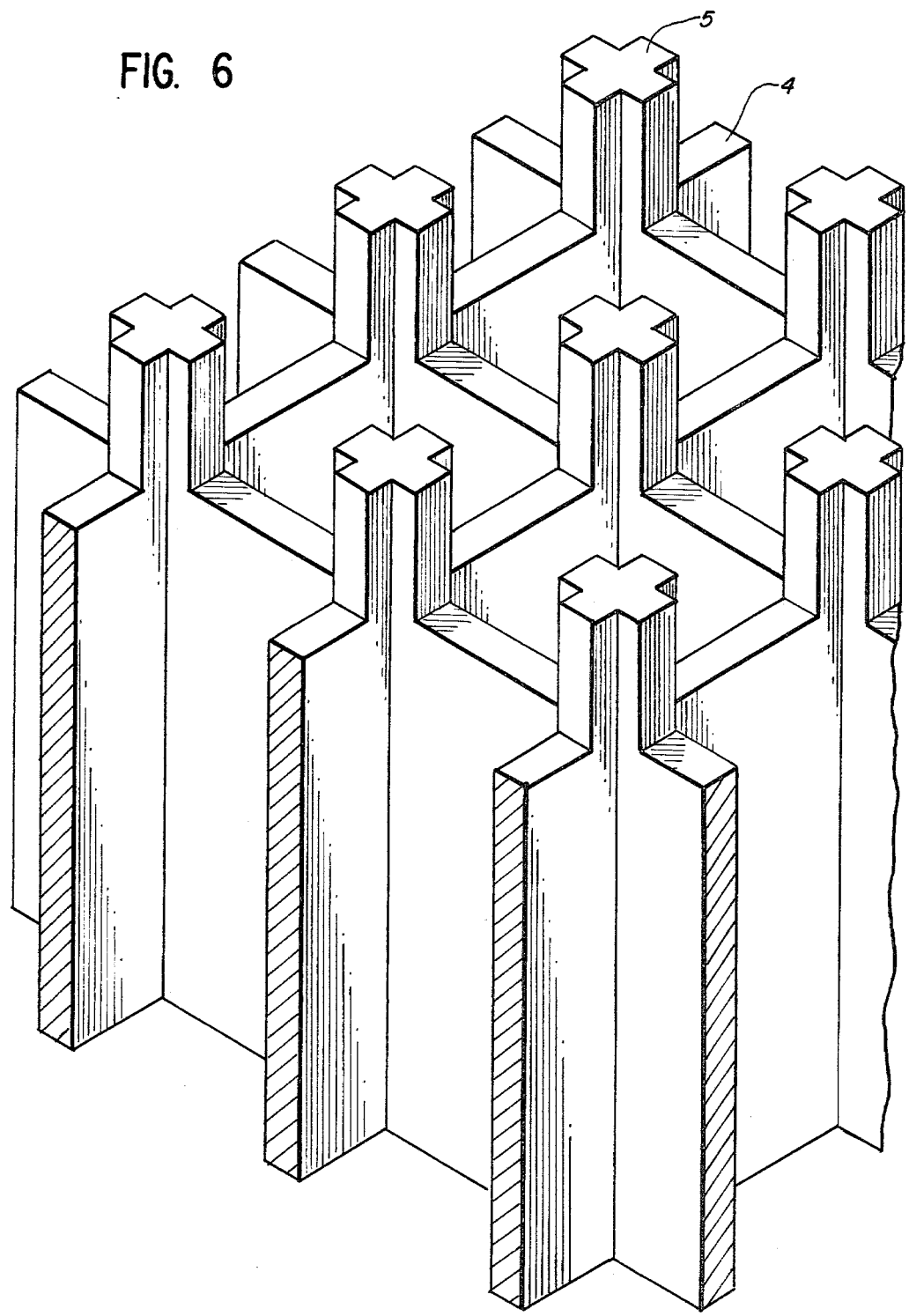
FIG. 6 is a perspective view of an enlarged section of the grid-type grate of FIGS. 4 and 5, including the spacers, as well as illustrating a filler body lying on top of the spacers.

FIGS. 6 and 7 illustrate and define the relationship between the height H of each spacer 5 to the size G of the illustrated filler body, as well as the relationship between the spacing or distance A between individual spacers (measured as the distance between the vertical central axes of the spacers) and the width W of each grid opening. These Figures illustrate the height "H" of each spacer 5 being equal to at least one-half the height or width "G" of the filler body. The height and width dimensions "G" of the filler bodies are equal to each other.

FIG. 8 shows spacers 5a in the form of cylindrical sleeves slipped on the intersections of the grid walls and supporting a filler body.

It should be pointed out that the particularly shaped filler bodies shown in the various Figures are merely illustrative of the kinds of filler bodies that may be used, and are not meant to limit the invention in any way.

Obviously, all types of filler bodies of all shapes and configurations can be used with the carrying grate of the present invention. The filler bodies may have various dimensions of height and width. However, for each particular carrying grate, having particular dimensions, particular corresponding filler bodies (of equal size) should be used. As a rule, the filler bodies are equal in size for the same substance exchange column.

The dimensions used in FIGS. 6 to 8 of the drawings correspond to the actual dimensions of the grid and filler bodies.

As described above, FIG. 9 illustrates the cylindrical sleeves 5a provided with rectangular slots. The embodiment of FIG. 9 relates to a grid having square openings and, therefore, each sleeve 5a is provided at its open end with four rectangular slots. When the sleeves are mounted on the grid walls, at the intersections thereof (the sleeves at their open ends), there is defined in each area of the intersections, a cruciform or cross-shaped cut-out member which is covered by a cylindrical sleeve 5a.

Figure 9:
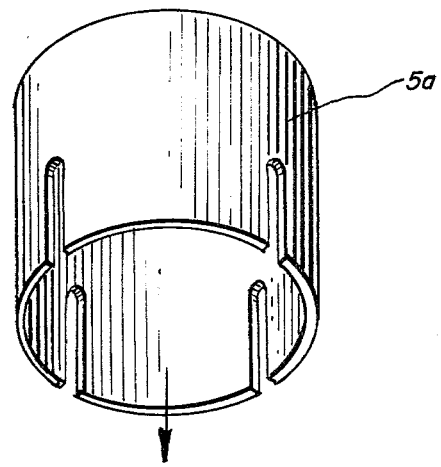
FIG. 9 illustrates the spacers 5a having the shape of cylindrical sleeves and provided with rectangular slots.
Figure 10:
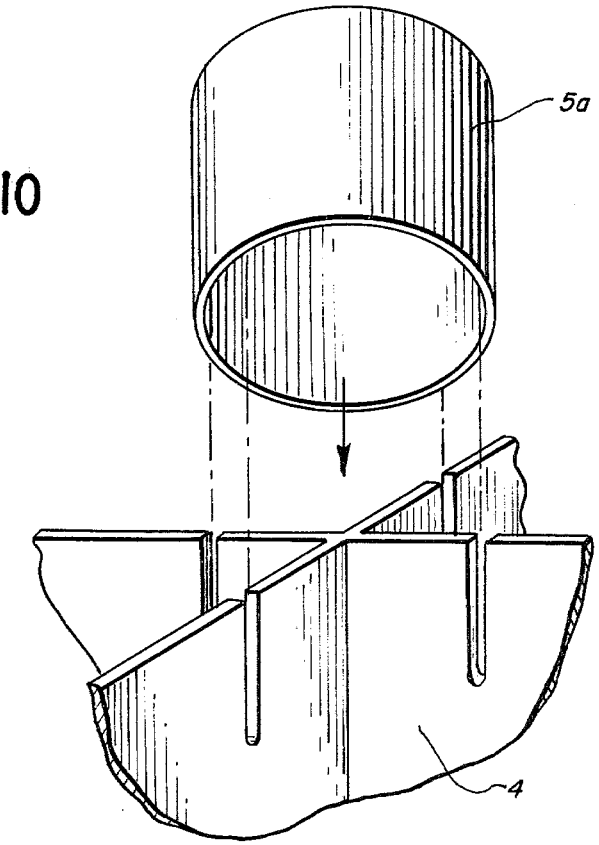
FIG. 10 illustrates another embodiment of the invention in which the grid walls at each intersection thereof are provided with slots, while the cylindrical sleeves 5a do not have slots.

FIG. 10 describes another embodiment of the invention in which the spacers 5a formed in the shape of cylindrical sleeves, are not provided with slots, as shown in FIG. 9. However, sections of the grid walls at each intersection of the walls, are provided with elongated and vertical slots. In accordance with FIG. 10, illustrating a grid having square openings, the sections of the grid walls at each intersection are provided each with a rectangular slot, the four slots defining together a cruciform or cross-shaped cut-out member. The cylindrical sleeves at their open ends, are slipped onto the grid walls at each intersection by means of these slots covering the cut-out members.

The basic embodiment of the invention is shown in FIGS. 11-14. This embodiment illustrates the spacing members 6 being equally spaced and separated from each other at a distance (42 mm) equal approximately to the width of the grid openings (42 mm).

The cylindrical sleeves 5a and slots of FIGS. 9 and 10, could also be used in the embodiment of FIGS. 11-14 instead of spacing members 6. The height of spacing member 6 corresponds to at least one-half the height or width (size) dimensions of a filler body or packing particle. In the embodiment of FIGS. 13 and 14, the height and width of the filler bodies ("G" in FIG. 13) are equal. The spacing members 6 can assume different shapes and forms, subject to the critical limits set forth above.

What is claimed is:

1. In a mass transfer column for carrying randomly dumped packing comprising a grate, which said grate includes a plurality of grid walls defining equally-sized openings, the improvement comprising irregularly poured filler bodies, carried by the grate, having predetermined height and width dimensions equal to each other, the grate having openings smaller in size than the filler bodies received therein, and spacing members disposed at each intersection of the grid walls, for supporting the filler bodies, said spacing members being equally-spaced one from another and at a distance approximately equal to the width of each of said openings, said spacing members having a predetermined height which corresponds to at least one-half the height of a filler body, so as to prevent the filler bodies from covering and closing said openings, and said spacing members comprise cylindrical sleeves having open and closed ends, each of said cylindrical sleeves being provided with elongated vertical slots at the open end thereof for slipping said sleeves on said grid walls at the intersections thereof, said sleeves covering the central areas of the intersections.

2. The improvement according to claim 1, in which sections of the grid walls at the intersections thereof are provided with elongated vertical slots, and said spacing members comprise cylindrical sleeves having open and closed ends, said open ends of said sleeves being slipped onto the grid walls at the intersections thereof by means of said slots, so that said sleeves cover the central areas of the intersections of the grid walls.

3. The improvement according to claim 2, in which the grid openings are square-shaped and said sections are provided each with a rectangular slot, said rectangular slots defining together cruciform or cross-shaped cut-out members at the intersections which are covered by said sleeves.

4. The improvement according to claim 1, in which the grid openings are square-shaped and said sleeves are provided each with four rectangular slots at the open end thereof for slipping said sleeves onto the grid walls and defining thereby cruciform or cross-shaped cut-out members covered by said sleeves.

* * * * *